(12) United States Patent
Robinson et al.

(10) Patent No.: US 9,219,878 B2
(45) Date of Patent: Dec. 22, 2015

(54) INTERACTIVE WINDOW

(71) Applicant: Hewlett-Packard Development Company, L.P., Houston, TX (US)

(72) Inventors: Ian N. Robinson, Palo Alto, CA (US); Kar Han Tan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 13/867,868

(22) Filed: Apr. 22, 2013

(65) Prior Publication Data

US 2014/0317561 A1 Oct. 23, 2014

(51) Int. Cl.
*G06F 3/033* (2013.01)
*G09G 5/08* (2006.01)
*H04N 7/15* (2006.01)
*G06F 3/0481* (2013.01)

(52) U.S. Cl.
CPC .............. *H04N 7/15* (2013.01); *G06F 3/0481* (2013.01)

(58) Field of Classification Search
None
See application file for complete search history.

(56) References Cited

U.S. PATENT DOCUMENTS

| 7,120,872 | B2 * | 10/2006 | Thacker ..................... 715/209 |
| 2011/0234746 | A1 | 9/2011 | Saleh et al. |
| 2012/0204120 | A1 | 8/2012 | Lefar et al. |
| 2012/0278738 | A1 | 11/2012 | Kruse et al. |

OTHER PUBLICATIONS

Bridgit Conferencing Software, (Web Page). http://smarttech.com/bridgit.
Using the iPad as a Digital Whiteboard (plus 4 Cool Free Apps to Try It Out), (Web Page). http://www.emergingedtech.com/2011/08/using-the-ipad-as-a-digital-whiteboard-plus-4-co.

* cited by examiner

*Primary Examiner* — Nicholas Lee
(74) *Attorney, Agent, or Firm* — Hewlett-Packard Patent Department

(57) ABSTRACT

A method performed by a system. The method includes automatically generating an interactive window on at least a portion of a display, the interactive window having a first size corresponding to a first pattern on the display. The method further includes automatically expanding the interactive window to a second size in response to a second pattern on the display to enclose the first pattern and the second pattern in the interactive window.

16 Claims, 8 Drawing Sheets

INTERACTIVE WINDOW

BACKGROUND

Effective communication between different parties is an important part of today's world. With the increased availability of high-speed network connectivity, video conferencing conducted over networks between participants in different locations has become very popular. Remote collaboration and videoconferencing systems enable remotely located users at several different sites to simultaneously collaborate with one another via interactive video and audio transmissions. A user at one location can see and interact with a user at other locations in real-time and without noticeable delay. At times during interactive collaborations, the systems may display content on the screens of the local and/or remote users. In addition, the systems offer various collaborative tools that help the users to communicate and share information.

DETAILED DESCRIPTION

Figure 1:
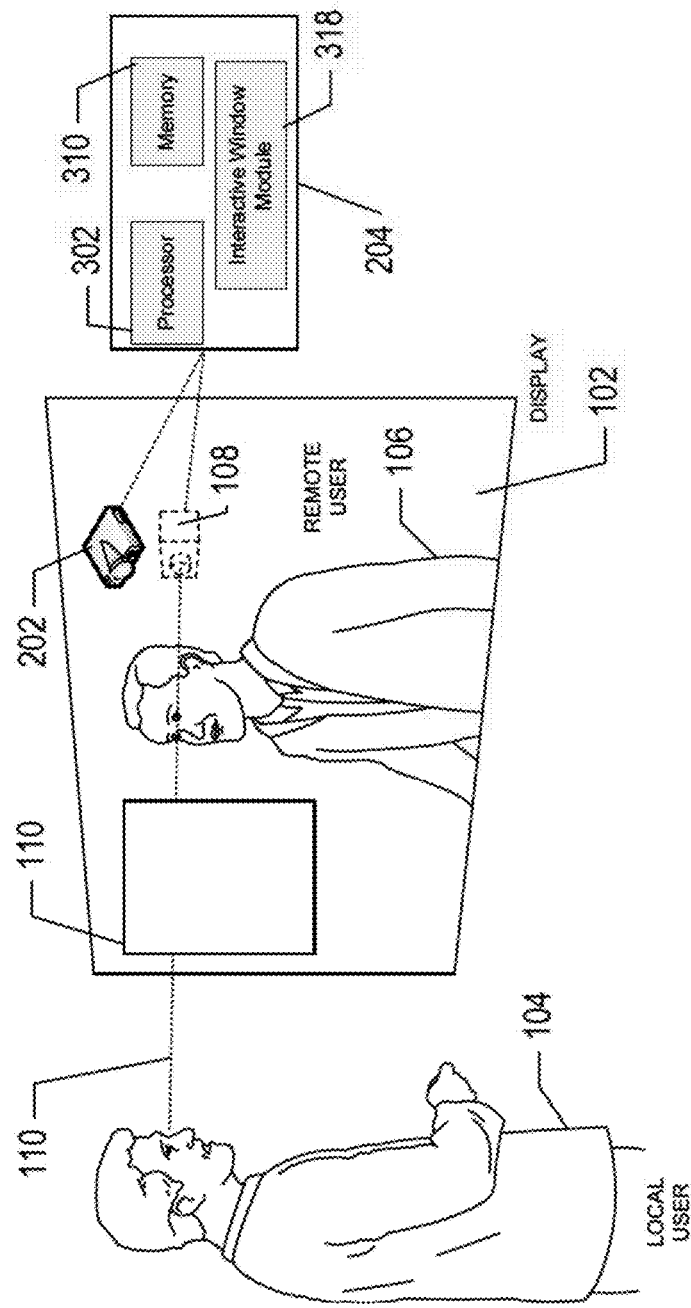
FIG. 1 is an example of two users video-conferencing through a display.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

As used herein, the term display-camera system refers to interactive collaboration and videoconferencing systems that share digital audio or visual media between remote users. The terms local site and remote site are descriptive terms that define a physical separation between the described systems, persons, or objects and other systems, persons, or objects. The physical separation may be any suitable distance between locations such as a short distance within the same room or between adjacent rooms of a building or a long distance between different countries or continents. The term local user refers to a person who views a local display-camera system, and the term remote user refers to a person who views a remote display-camera system.

As used herein, the term automatically refers to acting or operating in a manner essentially independent of external human influence or control. A system or an element of a system may have the capability to start, operate, perform functions, etc., independently of specific requests or regulations.

As used herein, the term content refers to visual and/or audio representation and information (e.g., text, image, video, etc.) that is reproduced for a user using any suitable computing or rendering (e.g., video or audio) output device for the display-camera systems described herein. The content may be displayed on displays of the display-camera systems. The content can also be created by a user through a use of an interface, such as a touch or contact-sensitive interface (e.g., a display), or through an input mechanism such as a pointer device (e.g., stylus, electronic pen, mouse, etc.) or a keypad. The term shared content refers to content that is displayed on both a local display-camera system and a remote display-camera system so the same content is simultaneously visible by a local user and a remote user.

The display-camera system can also allow interactive windows (i.e., added content) to be displayed on a display of the display-camera system. An interactive window (e.g., a virtual whiteboard) may define a specific area that includes a distinctive background and may include any suitable visual and/or audio information produced or displayed by an application or other suitable program. In one example, the interactive window allows local and remote users to generate content visible to both local and remote users. For example, a user of the display-camera system can view a whiteboard displayed on the display and can interact (e.g., draw, mark, etc.) on the whiteboard by using a pointer device or a finger (i.e., when the display has a contact-sensitive surface). As used herein, the terms interactive window and whiteboard are used interchangeably such that interactive window may also be referred to whiteboard and whiteboard may also be referred to as interactive window.

The terms overlaps and overlapping, when used with reference to the content displayed on the display-camera system, refer to at least portions of content (e.g., a video) and/or interactive window (e.g., a whiteboard) that are displayed on a common portion on the display. The term semi-transparent, when used with reference to interactive window, indicates that the interactive window or a portion of the interactive window is at least partially transparent so another content, including the displayed background image that overlaps with the interactive window, is at least partially visible to a user through the interactive window if portions of these contents overlap.

As described herein, a display-camera system is configured to display remote content, to capture local content, and to generate and display at least one interactive window (i.e., a whiteboard) at the same time. For example, the display-camera system receives remote content from a remote system (e.g., a remote display-camera system located in a remote site) that may include captured images of the remote site or a remote user and displays the remote content to a local user using an image rendering device (e.g., a projector) or a display. The display-camera system may also capture the local site and the local users through the display using a camera and transmits the that that to the remote system. Further, the display-camera system allows interactive windows (e.g., electronic whiteboards) to be displayed on a display of the display-camera system in response to patterns (e.g., virtual or physical movements or strokes by a user) on the display.

Users of the display-camera system frequently take advantage of the ability of the system to generate and display interactive windows. For example, many users routinely utilize a whiteboard as an interactive and collaborative tool for communication. A whiteboard allows the users to enter, display, share information with other users, manipulate the contents of that whiteboard as a whole (e.g. move or scale the whiteboard), and to save that shared information.

Operating the display-camera system in order to adjust, resize, and save information entered to a whiteboard or any other interactive window displayed by the system can present various issues to a user. For example, a user may want to save information entered on the whiteboard so that information can be distributed or shared at a later time. If an existing whiteboard covers the entire display of the display-camera system, a user may end up saving all the data entered on the whiteboard although he or she may only need to save a fraction of that data. This may require users to store and manipulate much more data than they wish. Therefore, users of such systems are always burdened with an additional task when using a whiteboard: they must either select a specific size of the whiteboard before start using it (i.e., in order to minimize the data that is saved), or they must select a specific portion of the whiteboard to be saved after the whiteboard is created. In any event, users must perform specific functions in order to save and/or manipulate data that is covered or inked on the whiteboard.

This description is directed to methods, systems, and non-transitory machine-readable storage medium that automatically create an interactive window on a display of a system and automatically adjust the size of the interactive window based on the virtual or physical patterns by a user. The proposed methods allow users to concentrate on generating and manipulating the data included on the interactive window without concern for creating, sizing, and saving the window. Therefore, users can devote their full attention to the substance of the data on the interactive window and the creation and sizing of the window is performed automatically based on the user's actions.

In one example, a proposed method involves automatically generating an interactive window on at least a portion of the display, where the interactive window has a first size corresponding to a first pattern on the display. The interactive window of the first size defines a default margin extending outside of a bounding area of the first pattern. The proposed method also involves automatically expanding the interactive window to a second size in response to a second pattern on the display to enclose the first pattern and the second pattern. The second pattern is within a predetermined time interval from the first pattern and the second pattern is at least outside of the bounding area of the first pattern to automatically expand the interactive window to the second size.

FIG. 1 shows an example of two video-conferencing users interacting through a display 102. The display 102 enables a local user 104 to interact with a remotely located user 106. In the illustrated example, a camera 108 and an image rendering device 202 (e.g., a projector) are positioned behind the display 102. An interactive window or whiteboard 110 is displayed on the display 102. The camera 108 may be positioned at approximately eye level to the local user 104, to capture images of the local user 104 through the display 102. The camera 108 can be positioned so that its viewpoint is roughly equivalent to that of the remote user 106. In order to capture gestures made by the local user 104, the camera 108 can also be positioned so that the camera's field of view encompasses approximately the entire display 102. In one example, the camera 108 and the projector 202 are connected to a computing device 204 having a processor 302, a memory 310, and an interactive window module 318 that controls the operation of the whiteboard 110 according to the proposed method.

Figure 2:
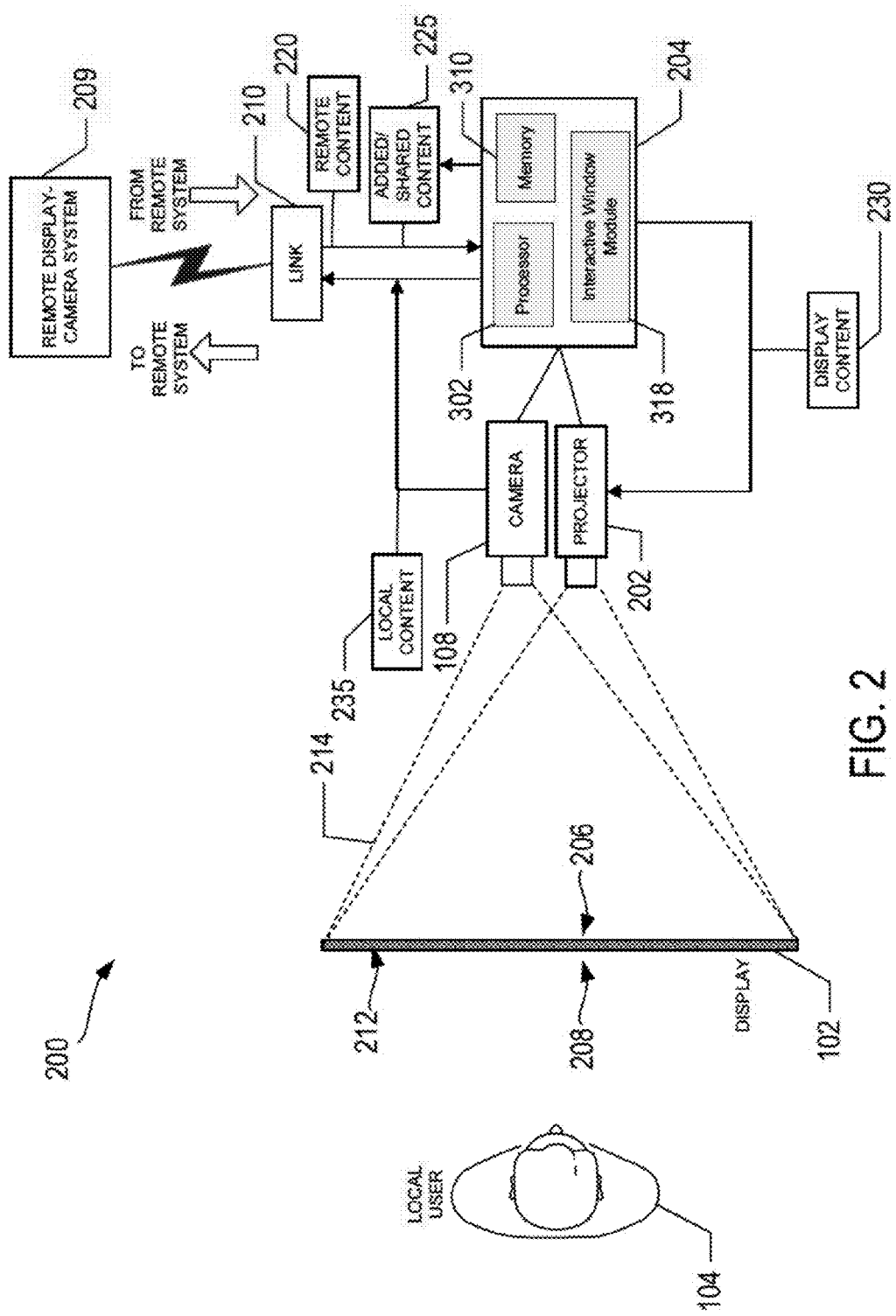
FIG. 2 is a schematic diagram illustrating an example of a display-camera system that generates interactive windows.

FIG. 2 is a schematic illustration of an example display-camera system 200 that generates interactive windows 110 (shown in FIG. 1). It is to be understood that the system 200 is illustrated only as an example and the methods described below can relate to any visual collaboration system (e.g., a system including at least two end-points that communicate over a network, where each end-point has at least a display and a computing device) where users can display shared content and use interactive windows. The illustrated system 200 includes the display 102, the camera 108, the projector 202, and the computing device 204 including the processor 302, the memory 310, and the interactive window module 318. The camera 108 and projector 202 are connected to the computing device 204, and the camera 108 and projector 202 are positioned to face the rear surface 206 of the display 102. In one example, the computing device 204 is in communication with a remote display-camera system 209 via a communication link 210. In one example, the camera 108 and projector 202 may be configured such that an image projected on the display 102 is not visible to the camera 108, so that the camera 108 only captures a view of the local user 104, but not of the contents displayed on the screen 102.

The display-camera system 200 receives remote content 220 from the remote display-camera system 209 using the link 210 where the remote content 220 may include captured images of a remote site including the remote user 106. In one example, the display-camera system 200 forms display content 230 from the remote content 220 and added content 225 (e.g., interactive windows 110, media content, etc.), if any, from the local and/or remote users and provides the display content 230 to the display 102. The added content 225 may be any suitable visual and/or audio information produced or displayed by an application or other suitable program. For example, the added content 225 can include an interactive window that allows local and/or remote users to generate content visible to both the local and the remote users. Further, the added content 225 can include content added by a user of the system 200 or content received from various external devices connected to the system 200. When the added content 225 is in the form of an interactive window 110, the interactive window may be displayed in conjunction with the remote content 220 in some examples. The process for generating and adjusting an interactive window performed by the interactive window module 318 is described in detail below. In another example, the display 208 of the system 200 displays unshared content (not show) that is not displayed on the remote system 209 (e.g., alert boxes, save dialogs, private data such as local file directories, etc.).

In additional examples, the added content 225 can include media input from, for example, a device or computer. The media input can include a media component that is shared between the system 200 and the remote system 209. The media input can include, for example, a document, an image, a video, a slide show or presentation, or other media content. Further, the added content 225 can include various interaction inputs from local user or the remote user (e.g., generation of electronic ink, etc.). In one example, the added content 225 can also be shared content that is displayed on both the local display-camera system 200 and the system 209 so the same content is simultaneously visible by the local user 104 and the remote user 106. For example, the computing device 204 can receive the added content 225 and can simultaneously send it to displays in both systems 200 and 209.

The display-camera system 200 displays the display content 230 using display 102 to produce displayed content 212 that is viewable by the local user 104 of display-camera system 200. In one example, the display-camera system 200 projects the display content 230 on the display 102 using the projector 202 to produce the displayed content 212. In another example, the display 102 can directly receive the display content 230 from the computing device 204 (e.g., as a sequence of display images) and can display the display content. The display-camera system 200 also captures local content 235 at the local site, including an image of the local user 104 through the display 102 using the camera 108 and transmits the local content 235 to remote system 209 using the link 210. The type and arrangement of the devices as shown in FIG. 2 is only shown one example, and many other types and arrangements of devices may be used in other examples.

In the example illustrated in FIG. 2, the projector 202 receives the display content 230 from the computing device 204 and projects the content to the display 102. For instance, the projector 202 may receive the display content 230 as a sequence of display images and can project the images in non-overlapping time periods. The projector 202 may represent any suitable type and number of projectors that project images on the display 102. The projector 202 is positioned to project images onto the rear surface 206 within this range of angles so that when the local user 102 views the front surface 208 of the display 102 the local user 104 sees the projected images. In some example's (not shown), the projector 202 may be positioned in front of the display 102 (e.g., next to or behind the local user 104) so the projector 202 may project images onto the front surface 208 of the display 102.

The display 102 displays the content to the local user 104. The display 102 may be composed of a relatively low concentration of light diffusing particles that diffuse light striking the rear surface 206 within a range of angles. In one example, the display 102 is at least partially transparent to allow the camera 108 to capture images of the local user 104, through display 102. Also, the display 102 may be sufficiently large so as to display life-size images of the remote users of remote system 209. In some examples, the display 102 may be a screen, a, a transparent liquid crystal display (LCD), an organic light emitting diode (OLED) display, or any suitable display.

The display 102 may be a touch or contact-sensitive display that includes touch sensors, optical sensors, or other contact sensors to allow for user's input via an input mechanism such as a pointer device (e.g., stylus, electronic pen, mouse, etc.) or a user's finger. The display 102 may also support gesture recognition operations (i.e., contactless interaction) where the user may interact with the display-camera system 200 or the remote system 209 by gestures in the air that are captured by depth image sensors on the display 102 and are interpreted via algorithms in the computing device 204. Therefore, users may generate interactive or added content (e.g., by using a whiteboard) that can be shared between the system 200 and the remote system 209.

The camera 108 captures local content 235 (e.g., the image of the local user) in response to control signals from the computing device 204. For example, the camera 108 captures local content 235 as a sequence of local images that are captured in non-overlapping time periods. The camera 108 provides local images 235 to computing device 204 and/or the link 210 for further processing or for transmission to the remote system 209.

In the illustrated example, the camera 108 is positioned behind the display 102 with a distance that is selected so that field of view 214 of the camera encompasses all or substantially all of the front side of display 102. Alternatively, the camera may also be positioned relative to the display 102 so that field of view 214 is aligned with all or a selected portion of the front side of display 102 to allow for a non-arbitrary mapping between camera 108 and display 102. The camera 108 may represent any suitable type and number of cameras that capture images through display 102. The camera 108 may be or may include any suitable image sensor, such as a digital charge couple device (CCD) image sensor or complementary metal-oxide-semiconductor (CMOS) image sensor. The camera 108 may include a processor (not shown), but may also be controlled by the processor 302 of the computing device 204. In one example, the camera 108 is configured to not capture any light from the display 102 itself, for example by rapidly alternating between displaying and capturing an image, or by displaying images using wavelengths of light that are blocked by filters (not shown) from the camera 108.

The communication link 210 includes any suitable type, number, and/or configuration of network and/or port devices or connections configured to allow display-camera system 200 to communicate with the remote system 209 and/or other remote systems (not shown). The devices and connections of link 210 may operate according to any suitable networking and/or port protocols to allow information to be transmitted by display-camera system 200 to a network, remote system 209 and/or other remote systems (not shown) or received by display-camera system 200 from a network, remote system 209, and/or other remote systems (not shown). For example, connections between the devices shown in FIG. 2 can be made through local area networks ("LANs"), wide area networks ("WANs") (e.g., a TCP/IP based network, a cellular network, etc.), public switched telephone networks ("PSTNs"), neighborhood area networks ("NANs"), home area networks ("HANs"), personal area networks ("PANs"), Intranets, the Internet, or any other suitable networks.

The remote system 209 represents any suitable display-camera system, display system, and/or processing system located remotely from display-camera system 20. The remote system 209 captures and/or provides remote content to display-camera system 200 and receives local content from display-camera system 200.

The computing device 204 provides control signals that control the operation of the display 102, the camera 108, the projector 202, and the link 210. The computing device 204 receives remote content 220 from the remote system 209 using the link 210. The computing device 204 generates display content 230 (including interactive windows) to be displayed and provides the display content 230 to the projector 202 to project it to the display 102. Further, the computing device 204 controls the operation of camera 108 to cause local images to be captured and transmitted to remote system 209 using link 210. As described in additional detail below, the computing device 204 implements various methods for generation and operation of interactive windows in response to processor 302 executing instructions or modules (e.g., the interaction window module 318) stored in the memory 310 of the computing device.

Figure 3:
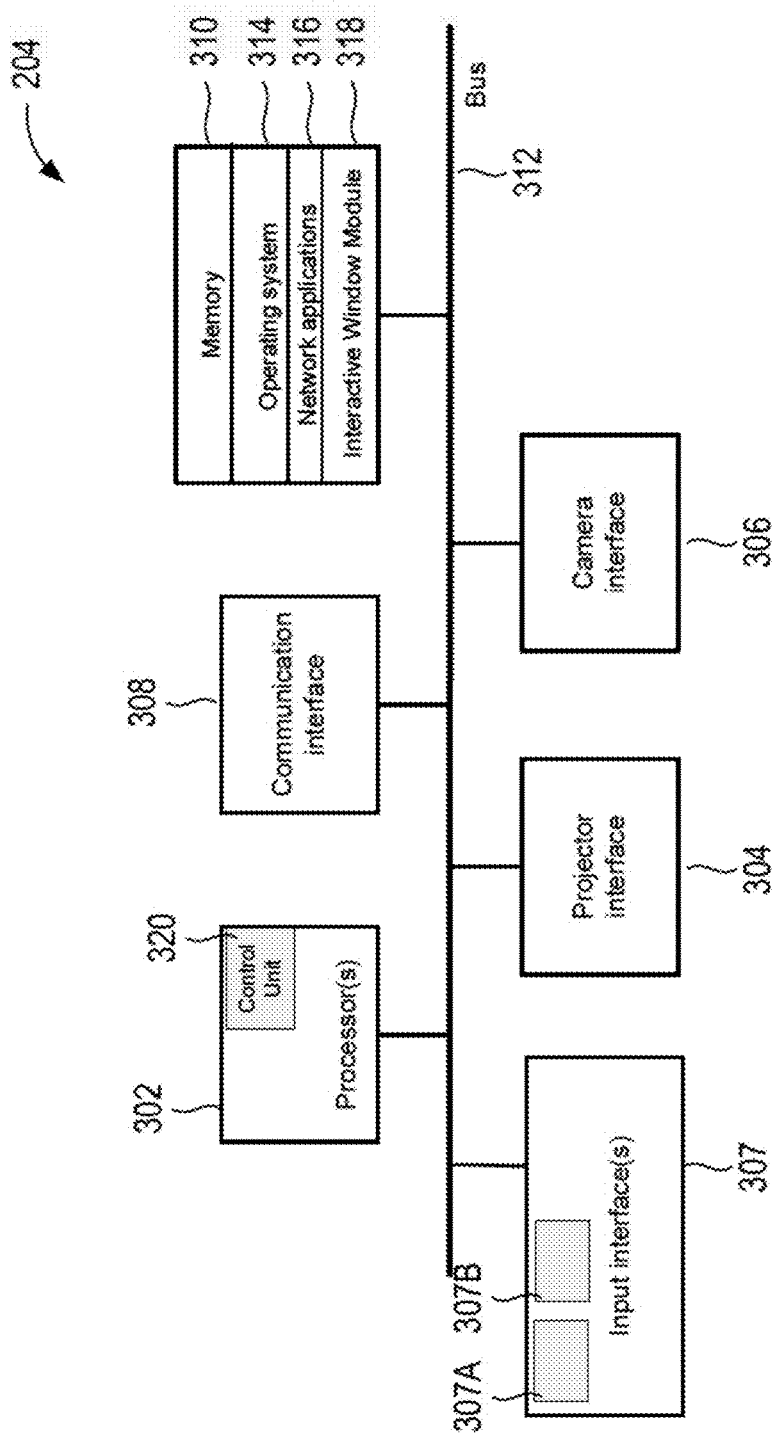
FIG. 3 is a schematic diagram illustrating an example of a computing device of the display-camera system of FIG. 2.

FIG. 3 shows a schematic representation of the computing device 204. The computing device 204 can be a server, a desktop computer, a laptop, or any other suitable device configured to carry out video and image processing. The computing device 204 can an independent device or can be integrated in the projector 202 or the camera 108. The computing device 204 includes a processor 302 (e.g., a central processing unit, a microprocessor, a microcontroller, or another suitable programmable device); a projector interface 304; a video or camera interface 306; input interfaces 307, a communication interface 308, and a memory 310. Each of these components is operatively coupled to a bus 312. For example, the bus 312 can be an EISA, a PCI, a USB, a FireWire, a NuBus, or a PDS. In other examples, the computer 204 includes additional, fewer, or different components for carrying out similar functionality described herein.

The projector interface 304 enables the computing device 204 to communicate with the projector 202 to display the display content 230 on the screen 102. The camera interface 306 enables the computing device 204 to communicate with the camera 108 to capture and process the local content 235. The communication interface 308 enables the computing device and the system 200 to communicate with a plurality of networks through use of the link 210. As described previously, the communication interface 308 can be used to receive remote content 220 from the remote system 209 and to send local content 230 to the remote system 209 or other remote systems.

The input interfaces 307 can process added content 225 from a user or an external device/system. In one example, the input interfaces include 307 at least a media interface 307A and an interaction interface 307B. The media interface 307A receives media input from a device or computer and can include, for example, a connector interface, a storage device interface, or a local or wireless communication port which receives the media input from a computer of the local user. As noted above, the media input may include, for example, a document, an image, a video, a slide show or presentation, or other media content.

The interaction interface 307B can process various interaction inputs from users (e.g., whiteboard entries, electronic inks, etc.). The interaction interface 307B can include or utilize sensors, such as touch sensitive sensors or optical sensors, which can be provided with, for example, the surface of the display 102. In one example, the interaction interface 307B can interact with the display 102 that includes sensors (e.g., contact-sensitive or touch sensors, optical sensors, proximity sensors, etc., not shown) used to detect user proximity, touch, or pen/ink input. The interface 307B can also detect other forms of inputs such as contactless interaction from a user (e.g., user's gestures above the display) by using depth image sensors or any other suitable sensors. In addition, the interaction interface 307B allows the computing device 204 to communicate with a mouse or an input device (e.g., a keyboard) which the user can utilize to create added content.

The processor 302 includes a control unit 320 and may be implemented using any suitable type of processing system where at least one processor is configured to execute computer-readable instructions stored in the memory 310. The memory 310 includes any suitable type, number, and configuration of volatile or non-transitory machine-readable storage media configured to store instructions and data. Examples of machine-readable storage media in the memory 310 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, hard disk, an SD card, and other suitable magnetic, optical, physical, or electronic memory devices. The memory 310 may also be used for storing temporary variables or other intermediate information during execution of instructions to be executed by processor 302.

The memory 310 may also store an operating system 314, such as Mac OS, MS Windows, Unix, or Linux; network applications 316; and an interactive window module 318. The operating system 314 can be multi-user, multiprocessing, multitasking, multithreading, and real-time. The operating system 314 can also perform basic tasks such as recognizing input from input devices, such as a keyboard, a keypad, or a mouse; sending output to a projector and a camera; keeping track of files and directories on medium 310; controlling peripheral devices, such as disk drives, printers, image capture device; and managing traffic on the bus 312. The network applications 316 includes various components for establishing and maintaining network connections, such as computer-readable instructions for implementing communication protocols including TCP/IP, HTTP, Ethernet, USB, and FireWire.

The interactive window module 318 provides various computer-readable instruction components for generating an interactive window or a whiteboard 110 and for modifying the size of the whiteboard 110 based on the user's actions.

The machine-readable storage media are considered to be an article of manufacture or part of an article of manufacture. An article of manufacture refers to a manufactured component. Software stored on the machine-readable storage media and executed by the processor 302 includes, for example, firmware, applications, program data, filters, rules, program modules, and other executable instructions. The control unit 320 is configured to retrieve from the machine-readable storage media and execute, among other things, instructions related to the control processes and methods described herein.

When executed, the instructions cause the control unit 320 to receive remote content 220 and added content 225 (e.g., interactive windows) and to generate and provide display content 230 to the projector 202 and the display 102. In one example, the displayed content 212 includes images from the remote user (i.e., remote content) and an interactive window 110 (i.e., a whiteboard) generated by the computing device and manipulated by a user. The instructions also cause control unit 320 to generate and provide control signals to the camera 108. The instructions also cause the control unit to 320 to generate and provide control signals to the link 210 to cause remote content 220 to be received from remote system 209 and/or other remote systems and cause local content 235 to be provided to remote system 209.

The following paragraphs describe methods for automatically generating and modifying interactive windows 110 performed by the processor 302 of the computing device 204. The proposed methods assist users in their interactive communication by allowing them to concentrate on the substance of the communication without a concern for the collaborative tools (i.e., the interactive window). The creation, sizing, and saving of the whiteboard and the generated content is performed automatically based on the user's actions.

Figure 4:
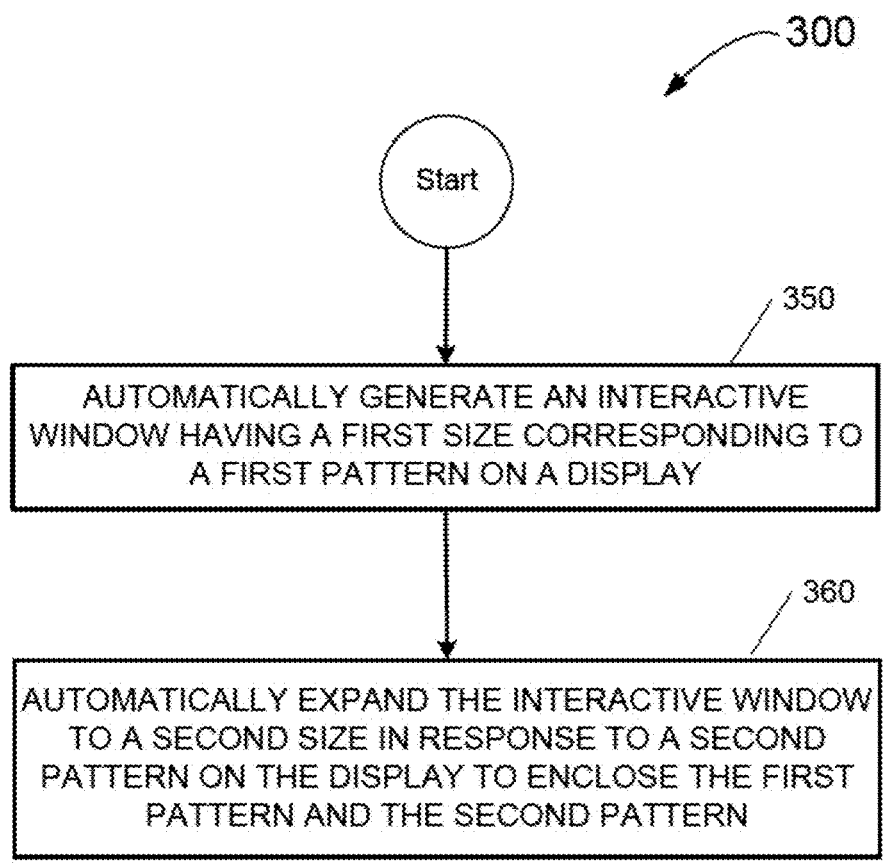
FIG. 4 is a flow chart illustrating an example of a method for automatically generating and expanding an interactive window.

FIG. 4 illustrates a flow chart showing an example of a method 300 for automatically generating and expanding an interactive window. The method 300 can be executed by the control unit 320 of the processor 302. Various steps described herein with respect to the method 400 are capable of being executed simultaneously, in parallel, or in an order that differs from the illustrated serial manner of execution. The method 300 is also capable of being executed using additional or fewer steps than are shown in the illustrated example.

The method 300 may be executed in the form of instructions encoded on a non-transitory machine-readable storage medium executable by the processor 302. In one example, the instructions for the method 300 are stored in the interaction window module 318.

The method 300 begins in step 350, where the control unit 320 automatically generates an interactive window 110 on at least a portion of the display 102, where the interactive window 110 has a first size corresponding to a first pattern on the display 102. When a local user 104 and the remote user 106 communicate via a display-camera system, the local user 104 can see an image of the remote user 106 on the display 102 (see FIG. 1). In one example, the image of the remote user 106 only takes a portion of the entire display 102. The users 104 and 106 may wish to interactively communicate with each other in real time via tools that add content on the display 102. As mentioned above, in one example, the display 102 can be a contact-sensitive display that includes various sensors to allow for user's input. Alternatively, the display 102 may also support contactless interaction via gesture recognition operations.

Figure 5A:
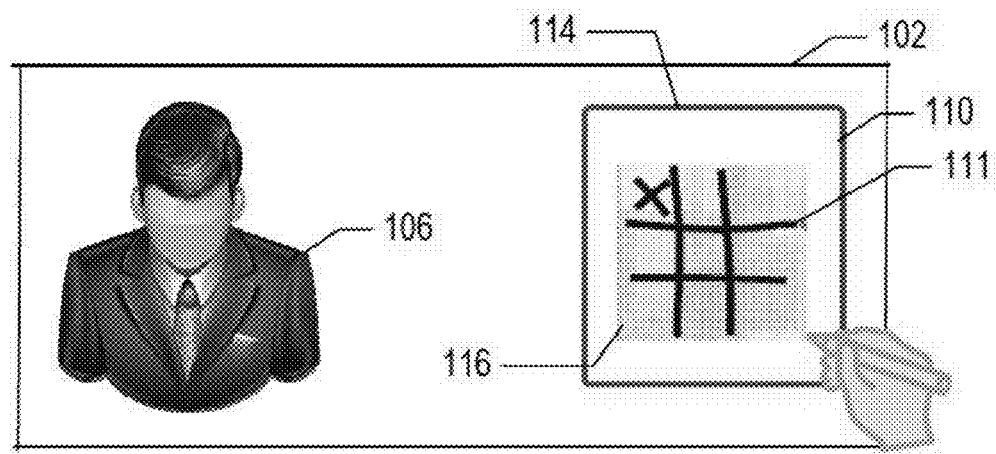
FIGS. 5A-5C are schematic illustrations showing examples of generating and expanding an interactive window.
Figure 5B:
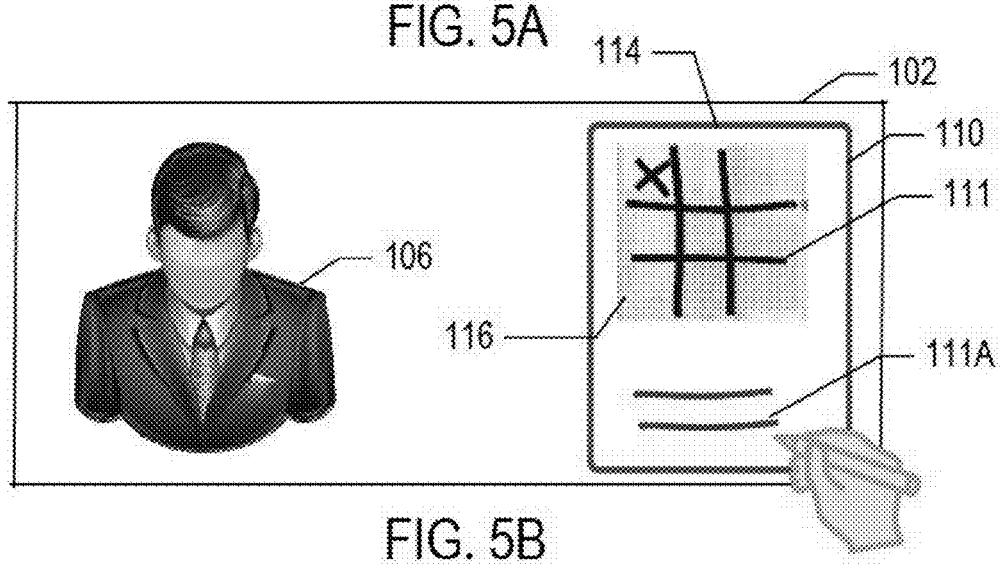
Figure 5C:
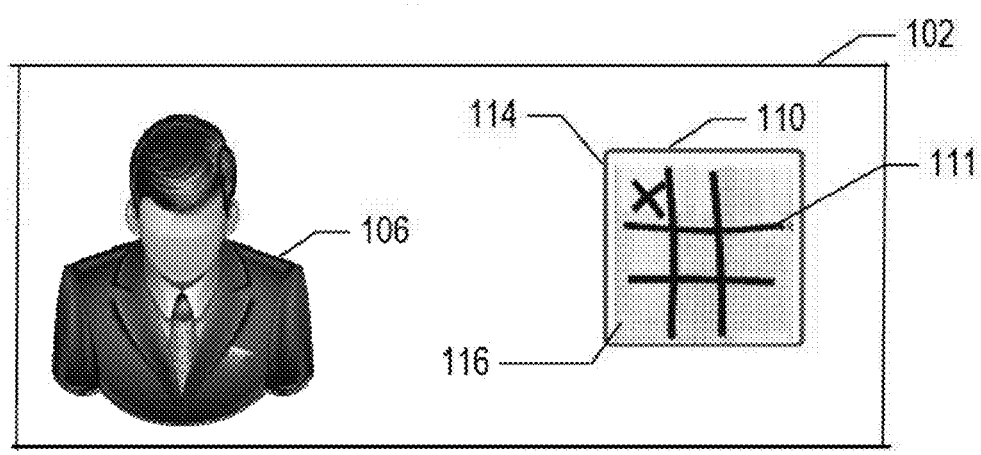

Therefore, a user can generate or create added or interactive content 225 either by directly marking (i.e., inking) on the display 102 or by gesturing in the air above the display 102. When a user adds such content on the display 102, the user creates a specific pattern on the display 102 based on his or her input. The pattern may be a virtual pattern generated by user's gestures or a physical pattern generated by the user's direct strokes or inks on the display 102 (e.g., by using a pointer device or a finger). Examples of patterns 111 and 111A are shown in FIGS. 5A-5C FIGS. 5A-5C are schematic illustrations showing examples of generating and expanding an interactive window 110. As shown in FIG. 5A, a user (e.g., the local user 104) views the remote user 104 and background (not shown) corresponding to the location of the remote user 106 on the display 102. When a user adds content on the display 102 in the form of the pattern 111, the control unit 320 automatically generates an interactive window or a whiteboard 110 on at least a portion of a display 102. In one example, the control unit 320 implements a "pen down" function to automatically generate the interactive window 110 as soon as a user inks or gestures on the display 102. In another example, the unit 320 implements a "pen up" function to automatically generate the interactive window 110 as soon as a user completes a pattern. In some examples, the interactive window 110 represents shared content that is displayed on both the local display-camera system 200 and the system 209. Therefore, the interactive window 110 is simultaneously visible and editable by the local user 104 and the remote user 106.

In one example, the interactive window 110 has a first size corresponding to the first (i.e., initial) pattern 111 created by the user. In that example, the interactive window 110 of the first size defines a default margin 114 extending outside of the bounding area 116 of the first pattern 111 (see FIG. 5A) regardless of the size of that bounding area. The bounding area 116 of the first pattern 111 is the area that includes or defines the boundaries of the user's strokes or gestures on the display 102. Therefore, in some examples, the initial size of the interactive window 110 (i.e., the default margin 114) is larger than the bounding area 116. As described in additional detail below, the control unit 320 may adjust the size of the interactive window 110 based on the actions of the user.

In another example, the interactive window 110 includes a semi-transparent background (not shown) that may include a distinctive color or shading. That semi-transparent background allows the user to see the images shown on the display 102 through the interactive window 110, when the interactive window overlaps with other content displayed on the display. At the same time, the semi-transparent background of the interactive window 110 provides contrast between a complicated background of the display 102 (e.g., the background of the remote user shown on the display) and the patterns generated on the display 102.

Next, in step 360 of the method 300, the control unit 320 automatically expands the interactive window 110 to a second size in response to a second pattern 111A on the display 102 to enclose the first pattern 111 and the second pattern 111A in the interactive window 110. Very often, users of the display-camera system 200 edit or update the interactive or added content 225 on the display 102. The method 300 assumes that the user always generates a second pattern some time after the first pattern. As shown in FIG. 5B, the user creates a second pattern 111A some period of time after the first pattern 111 is created. The control unit 320 determines whether the second pattern 111A is within a predetermined time interval from the first pattern 111 and whether the second pattern 111A is at least outside of the bounding area 116 of the first pattern 111 to automatically expand the interactive window 110 to the second size. The predetermined time interval for entry of the second pattern 111A may be, for example, 30 seconds, 45, seconds, or any other period of time that is chosen by the user and/or stored in the memory 310.

When the control unit 320 detects that the second pattern 111A is at least outside of the bounding area 116 of the first pattern 111 and the second pattern 111A is within the predetermined time interval, the control unit 320 automatically encloses the first pattern 111 and the second pattern 111A in the expanded interactive window 110 of the second size. If the second pattern 111A is within the bounding area 116 of the first pattern 111 and is also within the predetermined time frame, the control unit 320 does not expand the interactive window 110. Instead, the control unit 320 includes the second pattern 111A in the interactive window 110 of the first size (i.e., the original interactive window).

Further, if the second pattern 111A is outside the bounding area 116 of the first pattern but is within the default margin 114 of the interactive window of the first size, and the second pattern 111A is within the predetermined time frame, the control unit 320 automatically includes the second pattern 111A within the interactive window 110 of the first size without expanding it. Alternatively, when the second pattern 111A is within the default margin 114 of the interactive window of the first size but covers at least a portion of an additional content (e.g., media content) that extends outside of the default margin 114, the control unit can expand the interactive window 110 to a larger size and includes the second pattern 111A and the entire media content. In any event, the interactive window 110 and the content on the window are automatically saved in the memory 310 by the control unit 320 regardless whether the window 110 is expended or not.

Figure 6:
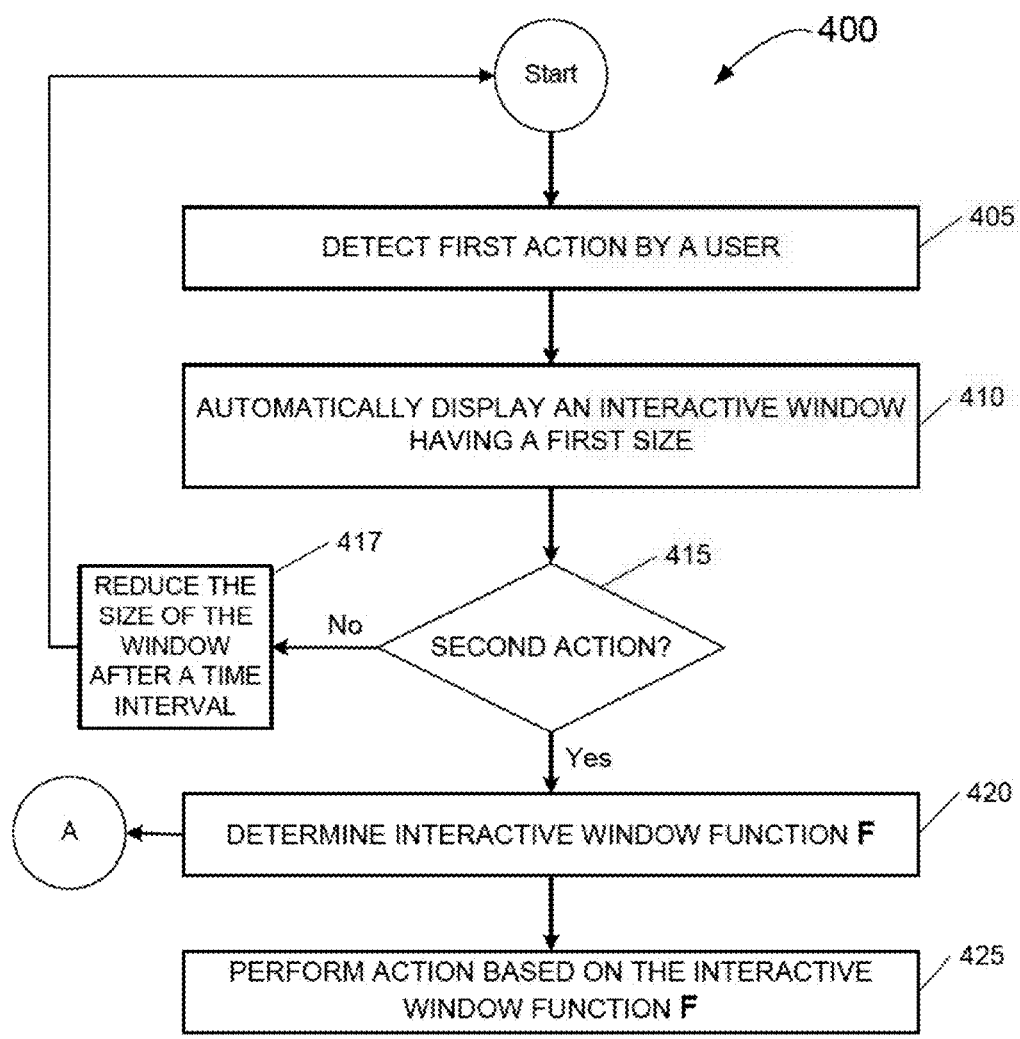
FIGS. 6 and 7 are flow charts illustrating examples of alternative methods for generating and modifying an interactive window.
Figure 7:
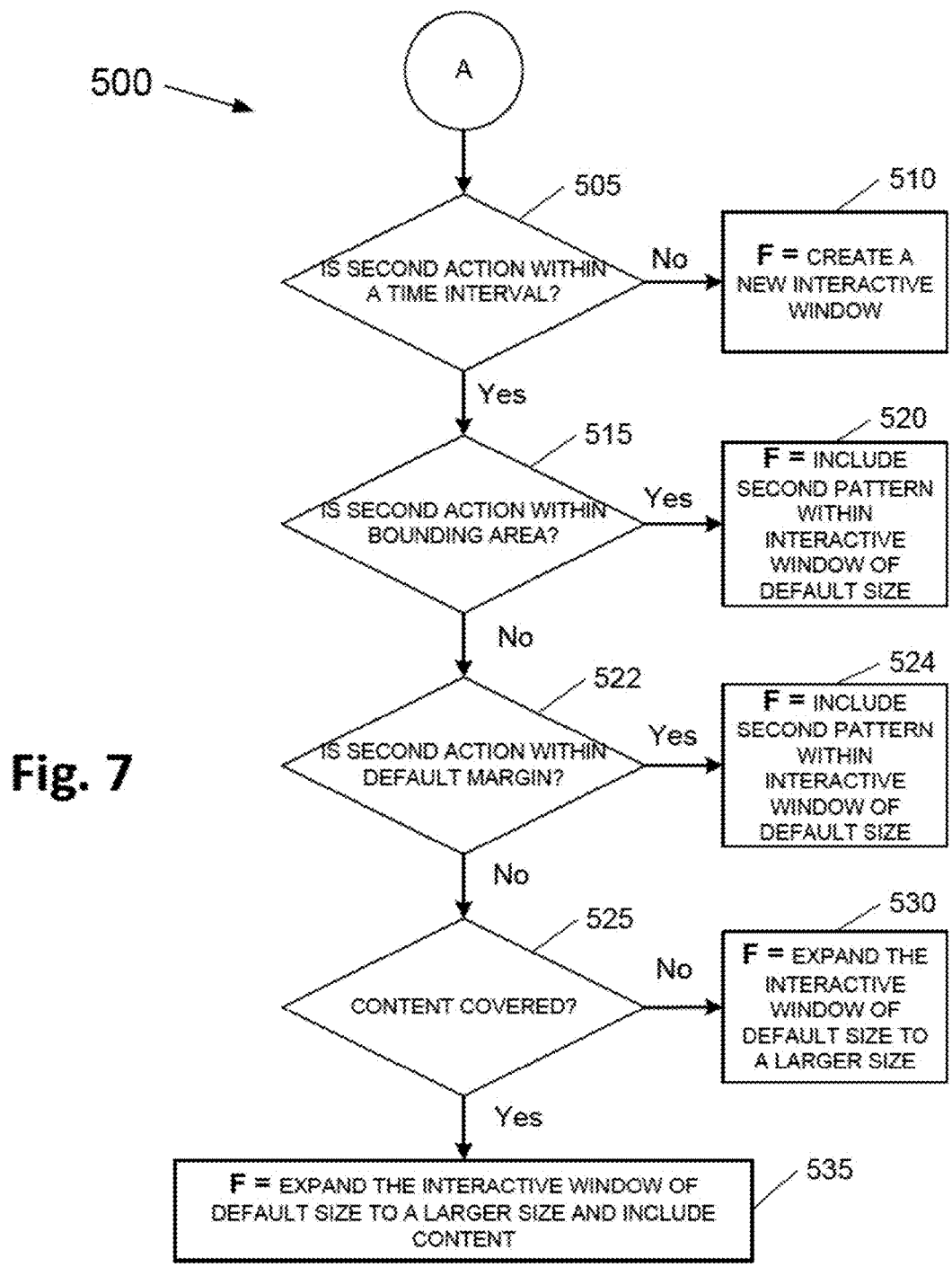

FIGS. 6 and 7 are flow charts illustrating examples of alternative methods for generating and modifying an interactive window. The methods can be executed by the control unit 320 of the processor 302. Various steps described herein with respect to the methods are capable of being executed simultaneously, in parallel, or in an order that differs from the illustrated serial manner of execution. The methods are also capable of being executed using additional or fewer steps than are shown in the illustrated example. The methods may be executed in the form of instructions encoded in the interaction window module 318 executable by the processor 302.

The method 400 begins in step 405, where the control unit 320 detects a first action by a user. In one example, the first action by the user includes strokes on the display 102 that generate a physical pattern of added or interactive content. In another example, the first action by the user includes user's gestures that generate a virtual pattern of added or interactive content (e.g., see the pattern 111 in FIG. 5A). Next, in step 410, the control unit 320 automatically generates and displays on the display 102 an interactive window or whiteboard 110 of a default size in response to the first action by the user. The whiteboard 110 of default size defines a margin 114 that is greater than the bounding area 116 (i.e., the area that includes the user's patterns in FIG. 5A) defined by the first action by the user. In one example, the default size of the initially created whiteboard 110 may be the same regardless of the first action or pattern. In another example, the default size of the initially created whiteboard 110 may vary depending on the size of the first action or pattern, where the margin 114 is always greater than the bounding area 116 of the pattern by some predetermined amount.

When the first action or pattern covers at least a portion of any additional content (e.g., media, etc.) on the display 102, the whiteboard 110 of default size includes (i.e., incorporates) the additional content displayed on the display that is at least partially covered by the first action. For example, if the display 102 displays an image and during the first action (i.e., pattern) a user covers (i.e., inks or gestures) at least a portion of that image, the control unit 320 includes the entire image in the generated whiteboard 110 of default size. Therefore, the whiteboard 110 of default size is adjustable based on the action or patter created by the user and the size of the additional content covered by the pattern. However, in one example, the margin defined by the whiteboard of default size is always greater than the bounding area defined by the first action.

In step 415, the control unit 320 determines whether there is a second action performed by the user within a first predetermined time interval or threshold following the first action. In one example, the second action includes a physical or a virtual pattern generated by the user. The first predetermined time interval can vary and can be any desired time interval. If the control unit 320 determines that there is no second action on the display by the user within the predetermined time interval, the control unit 320 automatically reduces the size of the initial whiteboard 110 (at step 417). FIG. 5C illustrates a whiteboard 110 that is reduced in size as compared to the initial whiteboard 110 of FIG. 5A when there is no second action by the user within the predetermined time period. As shown in FIG. 5C, in one example, the reduced size of the whiteboard 110 is defined by the bounding area 116 of the first action (i.e., first pattern) by the user. In other words, if the control unit 320 detects inaction from the user, the control unit simply adjusts the size of the margin 114 of the whiteboard 110 to correspond to the size of the initially added content and saves that whiteboard and its content to the memory. Alternatively, the user may manually reduce the size of the whiteboard 110 at any time.

If, on the other hand, the control unit determines that there is a second action (i.e., second pattern) by the user, the control unit 320 determines an interactive window function F based on the user's action (at step 420). Finally, in step 425, the control unit performs an action related to the interactive window 110 based on interactive window function F determined in step 420.

FIG. 7 illustrates an example of a method 500 for determining an interactive window function F for the method 400. In step 505, the control unit 320 determines whether the second action by the user is within a second predetermined time interval from the first action. In one example, the second predetermined time interval may the same as the first predetermined time interval from step 415. In other examples, the second predetermined time interval may be different from the first predetermined time interval. If the second action is not within the second predetermined time interval from the first action, the control unit 320 generates and displays a new interactive window or a whiteboard 110 based on the second action (at step 510).

If the second action is within the predetermined time interval from the first action, the control unit 320 determines whether the second action (i.e., pattern) is within the bounding area 116 of the already existing interactive window of default size 110 (at step 515). When the second action is within the bounding area 116 of the interactive window of default size 110, the control unit includes the second pattern in the already existing interactive window 110 (at step 520). If the second action is not within the bounding area 116 of the existing window 110, the control unit 320 determines whether the second action is within the default margin 114 defined by the interactive window of default size 110 (at step 522). When the second action is within the default margin 114 defined by the existing interactive window of default size 110, the control unit includes the second pattern in the already existing interactive window 110 (at step 524). Alternatively, when the second action is within the default margin 114 defined by the existing interactive window of default size 110 but the second action covers at least a portion of additional content (e.g., media content) that extends outside of the margin 114, the control unit 320 can extend the interactive window of default size to a larger size and can include the entire additional content that is at least partially covered by the second action.

In an example when the second action is not within the second predetermined time interval and is outside of the interactive window of default size (i.e., outside both the bounding area and the default margin), the control unit 320 creates a new interactive window 110. However, a user may wish to include add new content (i.e. a new pattern) to an existing whiteboard after the first or the second predetermined time intervals have passed. Therefore, in the same example, if a user makes an initial stroke or gesture in an already existing whiteboard and then creates another pattern (outside of the already existing whiteboard), the control unit 320 can automatically extend the already existing whiteboard to enclose the new pattern.

Next, when the second action or pattern is not within the default margin 114 defined by the existing interactive window, the control unit 320 determines whether the second action covers at least a portion of additional content or input on the display 102 (i.e., not generated by user's inking or gesturing) (at step 525). As mentioned above, the added content 225 can include media input (e.g., photos, videos, files, etc.) or other content that can be utilized by the users 104 and 106 during their communication.

Figure 8A:
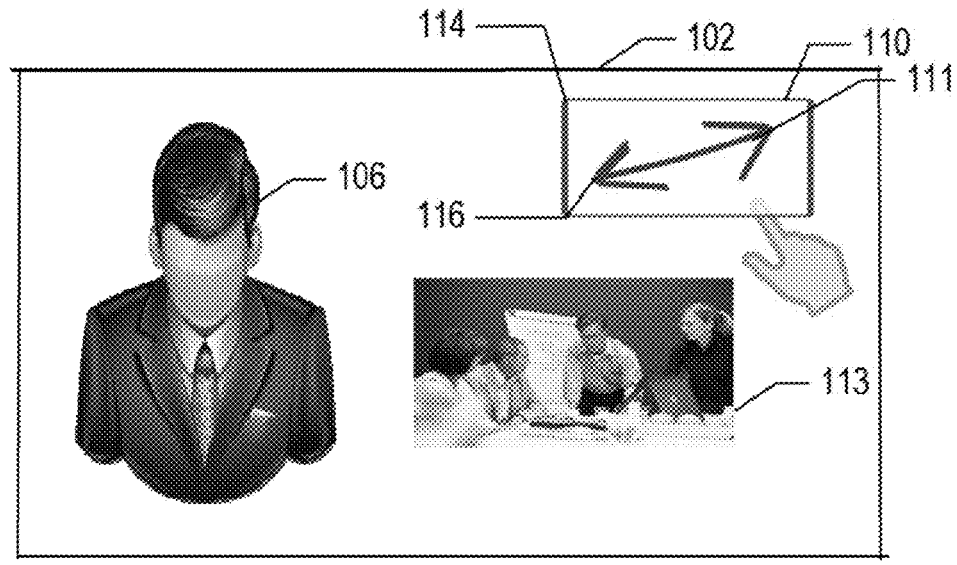
FIGS. 8A-B are schematic illustrations showing examples of generating and modifying an interactive window that includes media content.
Figure 8B:
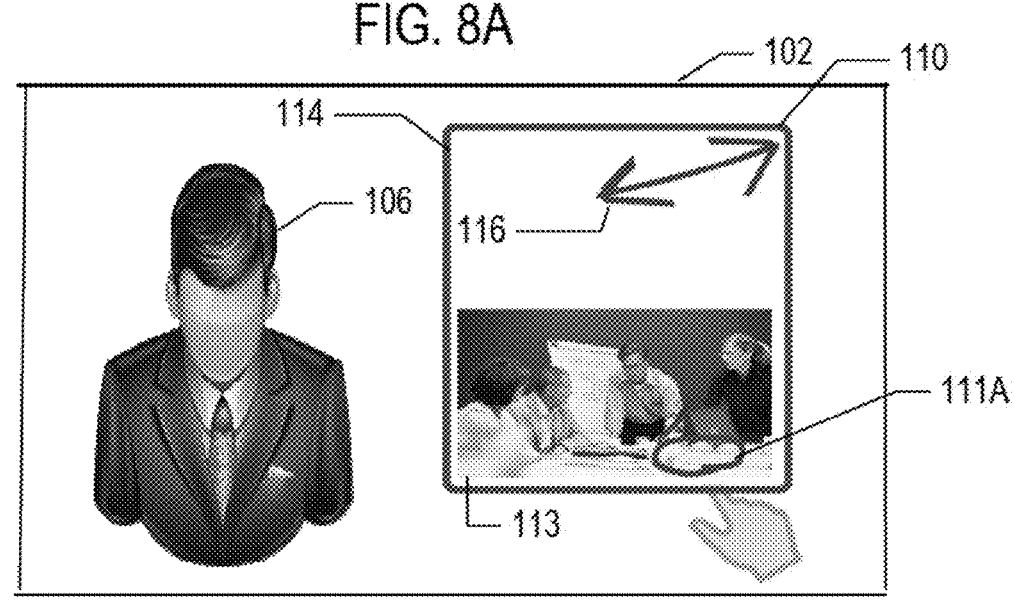

FIGS. 8A-B are schematic illustrations showing examples of generating and modifying an interactive window 110 that includes media content. As shown in FIG. 8A, the display 102 displays the remote user 106, the original interactive window 110, and the media content 113.

In one example, if the control unit 320 determines that the second action or pattern does not cover any additional content (e.g., media), the control unit automatically modifies (e.g., expands) the whiteboard to a larger size (i.e., creates a whiteboard of a second size) to enclose the second action or pattern without including any additional content (at step 530). When the control unit 320 determines that the second action or pattern covers at least a portion of any additional content (e.g., media), the control unit automatically expands the whiteboard to a larger size to include the second pattern and the entire additional content (e.g., media). In the example shown in FIG. 8B, during the second action or pattern 111A, the user covers (i.e., inks or gestures) a portion of the media content 113 before the second predetermined time interval expires. Because the media content 113 is outside of the bounding area 116 and outside of the default margin 114 of the whiteboard 100 of default size (FIG. 8A), the control panel 320 automatically expands whiteboard 110 to a larger size to include the second action or pattern 112 and the entire media content 113.

In some examples, a user can manipulate any of the created interactive windows 110 manually. For example, a user can move, collapse, extend, or perform any other manipulations to the interactive windows 110. A user may also save the interactive windows manually. When the display 102 includes two interactive windows 110 (not shown), the control unit 320 can merge the two interactive windows when a user clicks on both windows or drags one window into the other. Alternatively, the control unit 320 can capture one interactive window as an image into the other interactive window.

What is claimed is:

1. A method performed by a system, the method comprising:
    automatically generating an interactive window on at least a portion of a display, the interactive window having a first size corresponding to a first pattern on the display; and
    automatically expanding the interactive window to a second size in response to a second pattern on the display to enclose the first pattern and the second pattern in the interactive window;
    wherein the interactive window of the first size defines a default margin extending outside of a bounding area of the first pattern.

2. The method of claim 1, wherein the second pattern is within a predetermined time interval from the first pattern and the second pattern is at least outside of the bounding area of the first pattern to automatically expand the interactive window to the second size.

3. The method of claim 1, wherein automatically expanding the interactive window to the second size further comprises including on the interactive window of the second size a content displayed on the display and positioned at least outside of the bounding area of the first pattern when at least a portion of the content is covered during the second pattern.

4. The method of claim 2, further comprising automatically reducing the interactive window to a third size when there is no second pattern within the predetermined time interval from the first pattern.

5. The method of claim 4, wherein the third size of the interactive window is defined by the bounding area of the first pattern.

6. A system comprising:
    a computing device connected to an image rendering device, the computing device having a control unit to cause the image rendering device to
        automatically display on a display an interactive window of a default size in response to a first action by a user,
        automatically modify the interactive window to a larger size in response to a second action by a user, when the second action is performed within a predetermined time threshold from the first action.

7. The system of claim 6, wherein the first action and the second action include strokes on the display.

8. The system of claim 7, wherein the interactive window of default size includes a first content displayed on the display when the first action covers at least a portion of the first content.

9. The system of claim 8, wherein the interactive window of default size defines a margin that is greater than a bounding area defined by the first action, and wherein the control unit is to cause the image rendering device to automatically modify the interactive window to a larger size in response to the second action by a user when the second action is at least outside of the bounding area.

10. The system of claim 7, wherein the control unit is to cause the image rendering device to automatically reduce the size of the interactive window when there is no action on the display within the predetermined time threshold.

11. The system of claim 7, wherein the control unit is to cause the image rendering device to display a new interactive window in response to the second action by a user when the second action is performed after the predetermined time threshold.

12. The system of claim 7, wherein the interactive window of larger size includes a second content displayed on the display when the second action covers at least a portion of the second content.

13. A non-transitory machine-readable storage medium encoded with instructions executable by a processor of a system, the machine-readable storage medium comprising instructions to:
    automatically display on at least a portion of a display an interactive window of a default size covering a first pattern by a user, where the interactive window defines a margin that is greater than a bounding area defined by the first pattern; and
    automatically expand the interactive window to a larger size in response to a second pattern by a user, when the second pattern is within a predetermined time interval from the first pattern and the second pattern is at least outside of the bounding area,
    wherein the interactive window of default size includes a first content displayed on the display and the first pattern covers least a portion of the first content.

14. The non-transitory machine-readable storage medium of claim 13, further comprising instructions to display a new interactive window in response to the second pattern by a user, when the second pattern is after the predetermined time interval.

15. The non-transitory machine-readable storage medium of claim 13, further comprising instructions to automatically reduce the interactive window to a smaller size when the second pattern is after the predetermined time interval.

16. The non-transitory machine-readable storage medium of claim 13, further comprising instructions to include a second content within the interactive window of larger size when the second pattern covers a least a portion of the second content.

* * * * *

UNITED STATES PATENT AND TRADEMARK OFFICE
CERTIFICATE OF CORRECTION

PATENT NO. : 9,219,878 B2
APPLICATION NO. : 13/867868
DATED : December 22, 2015
INVENTOR(S) : Ian N. Robinson et al.

Page 1 of 1

It is certified that error appears in the above-identified patent and that said Letters Patent is hereby corrected as shown below:

Claims

In column 14, line 58 approx., in Claim 16, delete "covers a least" and insert -- covers at least --, therefor.

Signed and Sealed this
Twenty-sixth Day of July, 2016

Michelle K. Lee
*Director of the United States Patent and Trademark Office*